United States Patent [19]

Liebermann

[11] Patent Number: 5,315,920

[45] Date of Patent: May 31, 1994

[54] APPARATUS FOR HIGH-SPEED COSMETIC FINISHING OF PRECOOKED FOOD ARTICLES

[75] Inventor: Benno E. Liebermann, Louisville, Ky.

[73] Assignee: Beltec International, Aurora, Ill.

[21] Appl. No.: 837,047

[22] Filed: Feb. 18, 1992

[51] Int. Cl.⁵ .................. A47J 37/00; A47J 37/04
[52] U.S. Cl. ........................... 99/391; 99/390; 99/393; 99/427; 99/446; 99/448; 99/451; 99/DIG. 14; 219/388; 219/411
[58] Field of Search ............ 99/353, 355, 357, 385, 99/386, 420, 421 R, 427, 426, 443 C, 444, 443 R, 446, 451, 448, DIG. 14, 389–393; 219/388, 411, 10.55 R, 10.55 A, 10.55 E; 211/181; 426/241, 243

[56] References Cited

U.S. PATENT DOCUMENTS

| | | | |
|---|---|---|---|
| 3,421,432 | 1/1969 | Giepen | 99/448 |
| 3,667,372 | 6/1972 | Hilvitz et al. | 99/404 |
| 4,401,018 | 8/1983 | Berry | 99/420 |
| 4,600,596 | 7/1986 | Gongwer et al. | 99/448 |
| 4,670,775 | 8/1988 | Hoskins | 99/353 |
| 4,723,482 | 2/1988 | Weiss et al. | 99/443 C |
| 4,744,292 | 5/1988 | Nagata | 99/427 |
| 4,867,051 | 9/1989 | Schalk | 99/448 |
| 4,968,515 | 11/1990 | Burkett et al. | 99/421 R |
| 4,991,497 | 2/1991 | Barkhau et al. | 99/386 |
| 5,101,715 | 4/1992 | Liu | 99/451 |

FOREIGN PATENT DOCUMENTS 1039473  9/1983  U.S.S.R. ................. 99/448

Primary Examiner—Tomothy F. Simone
Attorney, Agent, or Firm—Wallenstein, Wagner & Hattis, Ltd.

[57] ABSTRACT

The invention is an apparatus for heat processing of food. The invention includes a frame which supports the subcomponents of the apparatus. The apparatus' subcomponents include a rack having a plurality of hook-like projections for holding the food. A rack displacement assembly reciprocally moves the rack between a food loading position and a heat processing position. The rack displacement assembly includes both a lever and a cable and pulley-actuated linkage. The rack is moved into a heating cavity when that rack is in its heat processing position. Heating means are provided on at least one side of the heating cavity.

11 Claims, 5 Drawing Sheets

APPARATUS FOR HIGH-SPEED COSMETIC FINISHING OF PRECOOKED FOOD ARTICLES

TECHNICAL FIELD

The invention relates generally to an apparatus and method for cooking, i.e., grilling and broiling of frozen and/or refrigerated food articles, as well as high-speed and cosmetic finishing of precooked food articles. Particularly, the invention relates to an apparatus and method of cosmetically finishing food by placing that food within a cavity that has at least one vertical or horizontal heat source adjacent that cavity.

BACKGROUND OF THE INVENTION

The desirable appearance of food has much to do with its cosmetic eye appeal. Foods that are subjectively pleasing to the eye are generally more appetizing than those foods that are prepared in an improper or careless manner. One of the subjectively pleasing aspects of a food's appearance is its color and shaded nuances. The color of a prepared food is an especially important factor in the eye appeal of meats, including, but not limited to, poultry, beef, pork and fish. Typically, consumers prefer a darker color, ranging from a light brown in poultry products to a much darker, nearly blackened, color for certain beef products. Unfortunately, many conventional one-step cooking processes properly cook the food, but impart an unacceptable, nonappealing color. Other such one-step processes may produce food products with an acceptable color, but which are inadequately or otherwise nonideally cooked, i.e., not cooked to a safe internal product temperature.

In addition, it is difficult to attain consistent, proper color in many preprocessed foods. For example, chicken may be fully cooked at large food processing facilities. The cooked chicken is then quickly frozen and shipped to restaurants, cafeterias and the like. These restaurants retain the food in freezers until shortly before it is to be consumed. The frozen, precooked chicken parts are placed on the shelves of large warming ovens. After an appropriate time period, the chicken in the oven has been thawed and warmed to the ideal and safe temperature for consumption. Such chicken, however, lacks the light- to medium-brown color preferred by most consumers. Instead, the surface of this chicken has a beige color. As a result, the chicken does not have "eye-appeal" and is rejected on sight by a certain number of consumers. This rejection occurs even though the chicken is otherwise perfect and has an excellent flavor, texture and aroma.

Devices for the preparation of food are disclosed in many United States patents. These patents include U.S. Pat. Nos. Re. 24,296, 3,249,741, 3,479,188, 3,559,564, 3,682,643, 3,783,220, 4,051,347, 4,396,817, 4,701,585, 4,771,154, 4,943,697, 4,957,041 and 4,957,042.

SUMMARY OF THE INVENTION

The invention is an apparatus for high-speed, high-temperature processing of food which eliminates shortcomings of prior art food processing systems. The invention includes a frame which supports the subcomponents of the apparatus. The apparatus' subcomponents include a rack which is removable for cleaning purposes, and which has a plurality of hook-like projections for holding the food. A rack displacement assembly reciprocally moves the rack between a food loading position and a heat processing position. The rack displacement assembly includes both a lever and a cable and pulley-actuated linkage. The reciprocating motion can be automated with motorized means. When the rack is moved into a heating cavity, the rack is in its heat processing position. Heating means are provided on at least one side, and preferably two sides, of the heating cavity.

The invention is also a method of heat processing and cosmetically finishing food. The method comprises the steps of precooking the food to a state of bacteriological safety, i.e., nontoxicity. The food is then introduced into a cavity which has, at at least one of its ends, a source of intense, high-temperature heat. The surfaces of the food within the cavity are heated with this intense heat source until the surface of the food is caramelized. In yet another aspect of the method invention, the cavity is kept substantially free of air currents, i.e., noninduced convection. This is done using a largely enclosed heating portion or chamber, vented only at the bottom and top.

Thus, this new infrared, high-temperature heating method departs from conventional techniques by separating into phases the single or one-step process of cooking and cosmetically finishing a food article from its raw, uncooked state.

Particularly, in the first phase, the product is first cooked using low temperatures, as necessary to reach the appropriate level of "doneness" while still maintaining the desirable, organoleptically-appealing characteristics of the food article, such as moisture content, tenderness and the like. These low temperatures are insufficient to effect caramelization of sugars or sugar derivatives contained in either the food article or its natural or added coatings.

In the second phase, this previously cooked, but visually unattractive, food article is exposed to a source of high-temperature infrared radiation to caramelize the outside of the food article.

DETAILED DESCRIPTION OF THE PREFERRED EMBODIMENT

A preferred apparatus of the invention is shown in general in FIGS. 1-4. This apparatus has two racks, and each rack may be vertically raised and lowered independently with independent mechanisms. An apparatus with fewer or more racks may also be designed in a manner that should be apparent. The user will obtain a unit having a number of racks appropriate for the production capacity requirements. FIG. 5 shows an electrical diagram of the preferred unit. The electrical circuitry of FIG. 5 forms no part of the invention. It should be understood that circuitry providing for automatic heating is unnecessary. The same heating and browning functions may be accomplished by manual control of the heating elements.

In describing this embodiment, its use for the browning of poultry, such as skinless chicken, will be discussed. In fact, the unit was specifically prepared and intended for browning or caramelizing the skin or skinless exterior of foods. It will be understood by those skilled in the art, however, that the unit may also be used for other purposes. To provide but one nonlimiting example, the unit could also be used for the cooking and/or browning of ground beef, pork, chicken and turkey patties.

Figure 1:
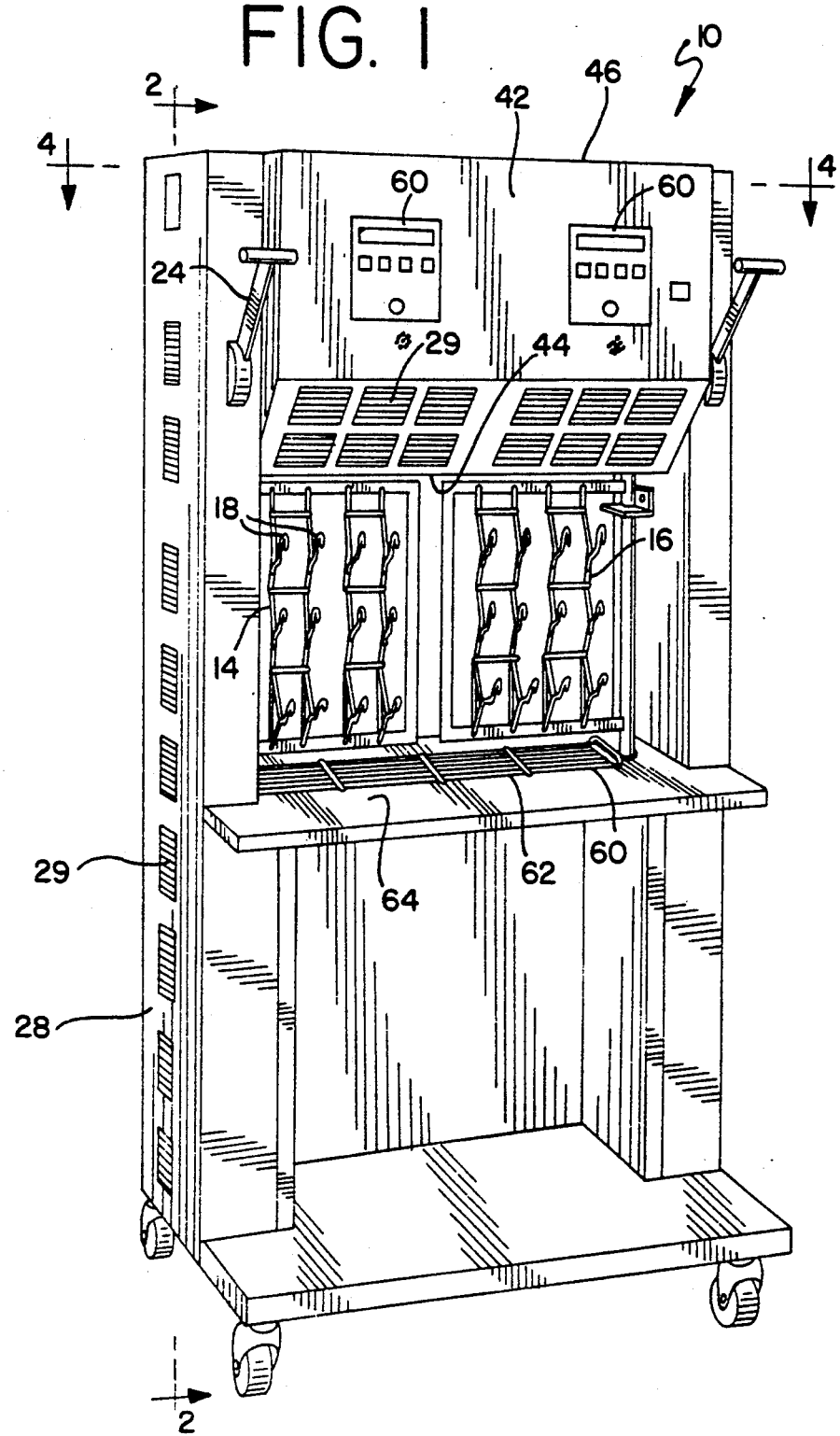
FIG. 1 is a perspective view of a preferred embodiment of the apparatus of the invention.

A perspective view of the apparatus 10 appears in FIG. 1. This apparatus is specifically designed for the heat processing of food. As may best be seen from FIG. 2, the apparatus 10 includes a structural frame 12 to which the side panels, movable components, heating components, wheels and control components of the apparatus are secured. For corrosion resistance and ease of cleaning, governmental food preparation codes frequently require that apparatus for handling food be largely made of stainless steel. For this reason, the structural components and panels of the apparatus are primarily comprised of 304-stainless steel.

The apparatus also includes at least one rack. In this preferred embodiment, however, two independently controllable racks 14 and 16 are provided. These racks 14 and 16 are virtually identical in all important respects and, thus, only one of the racks 14 need be described in detail.

Rack 14 includes a plurality of hook-like projections 18 which extend upwardly from the rack 14. These hook-like projections 18 are shaped and sized so that one projection or a pair of adjacent projections will hold, without auxiliary clamping devices, a piece of the food being processed by the apparatus 10.

Figure 2:
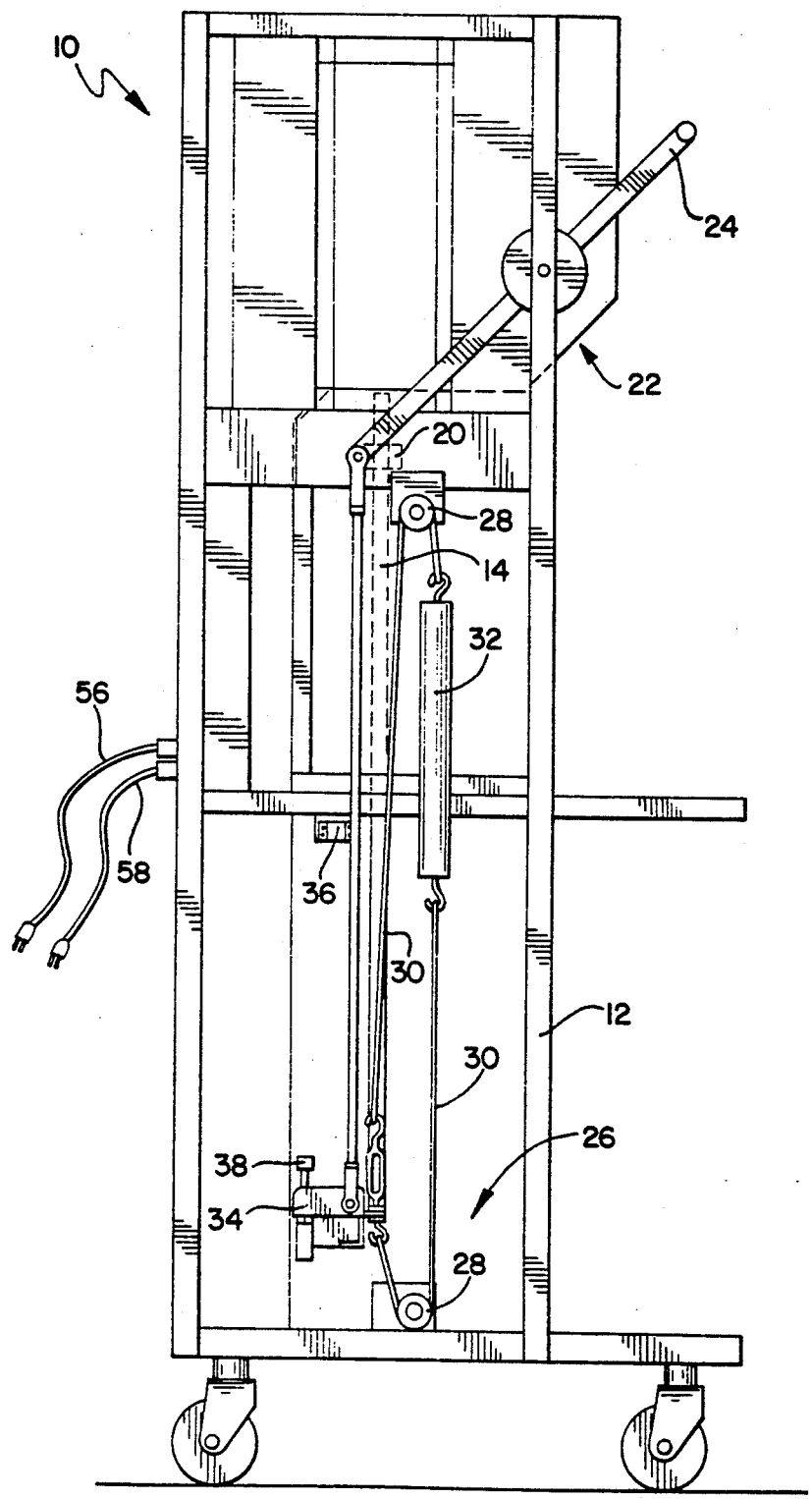
FIG. 2 is a side view of the apparatus, taken along lines 2—2 of FIG. 1, with a side panel of the apparatus removed to reveal components of the rack displacement means for reciprocally moving the rack between a food loading position and a heat processing position, and with the rack in the lowered, food loading position.
Figure 3:
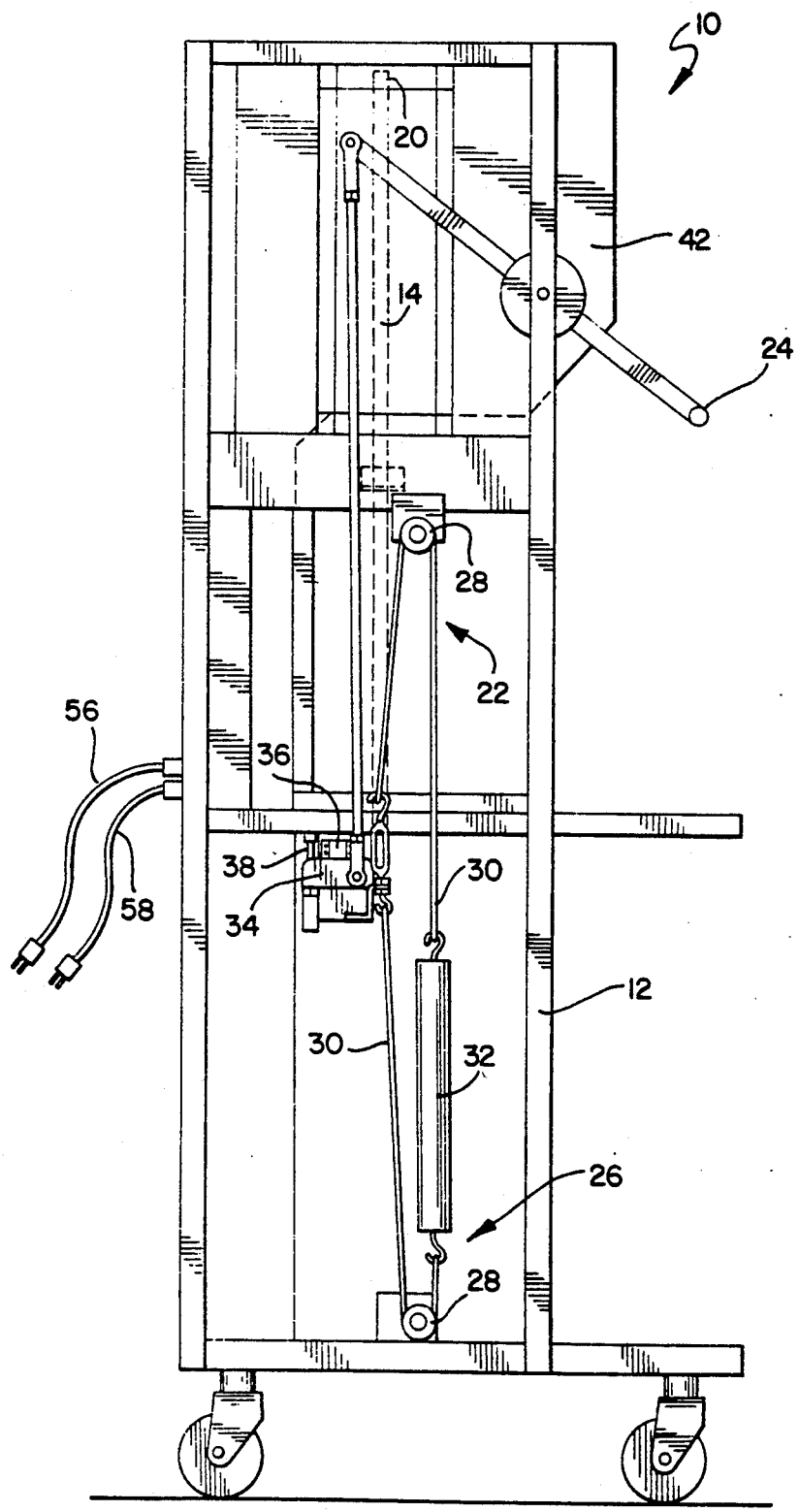
FIG. 3 is another view of the apparatus similar to the view as shown in FIG. 2, but with the rack displacement means disposed to permit the rack to be raised to its heat processing position.

Rack 14 is mounted on a support (shown as 20 in the dashed lines of FIGS. 2 and 3). The rack 14 and its support 20 are, in turn, connected to rack displacement means 22 for reciprocally moving the rack between a food loading position, as shown in FIGS. 1 and 2, and a heat processing position as shown in FIG. 3.

The rack displacement means 22 includes a lever 24. The lever 24 is normally at rest in the position shown in FIGS. 1 and 2. When the lever 24 is in this position, the rack is in its food loading position and chicken pieces may be loaded onto the hook-like projections 18. After food has been loaded onto the hook-like projections 18 of the rack 14, the lever 24 is pulled downwardly with some force until the rack 14 is urged upwardly into its heat processing position (FIG. 3).

A linkage 26 facilitates the upward and downward movement of the rack 14, and may best be seen in FIGS. 2 and 3. In these FIGS., this linkage 26 is exposed by the removal of a side panel 28 of the apparatus 10. This side panel 28, and various other panels of the apparatus 10, include vents 29. The linkage 26 of this embodiment includes several pulleys 28 and various lengths of cable 30. A counterweight 32 assists the linkage 26 in moving the rack 14 from the lowered, food loading position of FIGS. 1 and 2 to the raised, heat processing position of FIG. 3. Although the linkage 26 of this embodiment includes a cable and pulley arrangement, it will be understood by those skilled in the art that this arrangement can be replaced by a chain and sprocket arrangement, and can be motor driven. It has been found, however, that the pulley and cable arrangement operates more smoothly, and does not move as abruptly, when temporarily released.

The apparatus 10 also includes a metallic element 34 (FIGS. 2 and 3) associated with the cable and pulley-actuated linkage 26. In the embodiment shown in the FIGS., this metallic element 34 is secured to a portion of the linkage 26 and moves upwardly and downwardly with the portion of the linkage 26 to which it is secured. Secured to the frame 12 of the apparatus 10 is a magnetic holding means 36. This magnetic holding means 36 attracts metal. Thus, as the metallic element 34 approaches the magnetic holding means 36, the magnetic force of the latter pulls the metallic element 34 into contact. In this manner, the metallic element 34 and the magnetic holding means 36 cooperatively aid in retaining the rack 14 in its raised, heat processing position.

The apparatus further comprises a shock-absorbing element 38. As may be seen from FIG. 3, this shock-absorbing element 38 limits the travel of the metallic element when the rack 14 is moved into its heat processing position. This shock-absorbing element 38 in this way provides for a smoother stop action on the part of the rack 14 when it reaches its top limit of travel.

Figure 4:
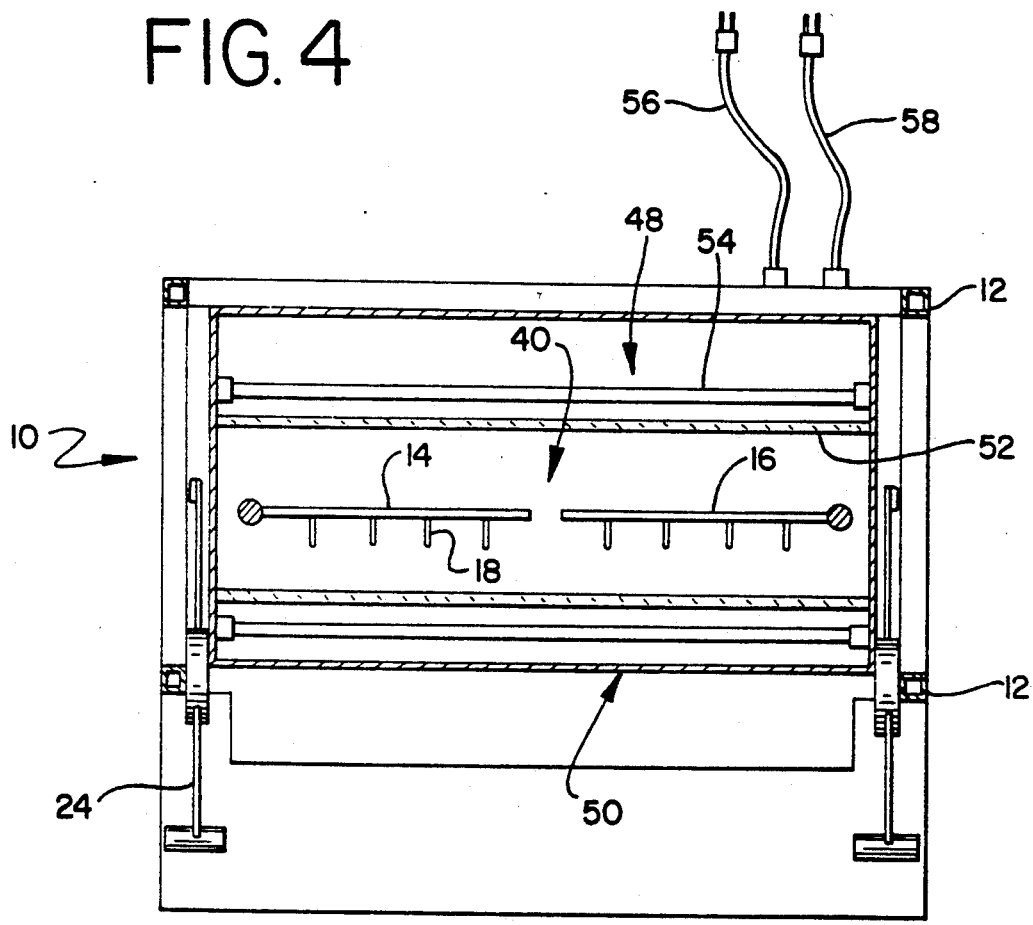
FIG. 4 is a view along the top of the apparatus taken along lines 4—4 of FIG. 1, and showing the heating means and two ceramic panels adjacent the cavity.
Figure 5:
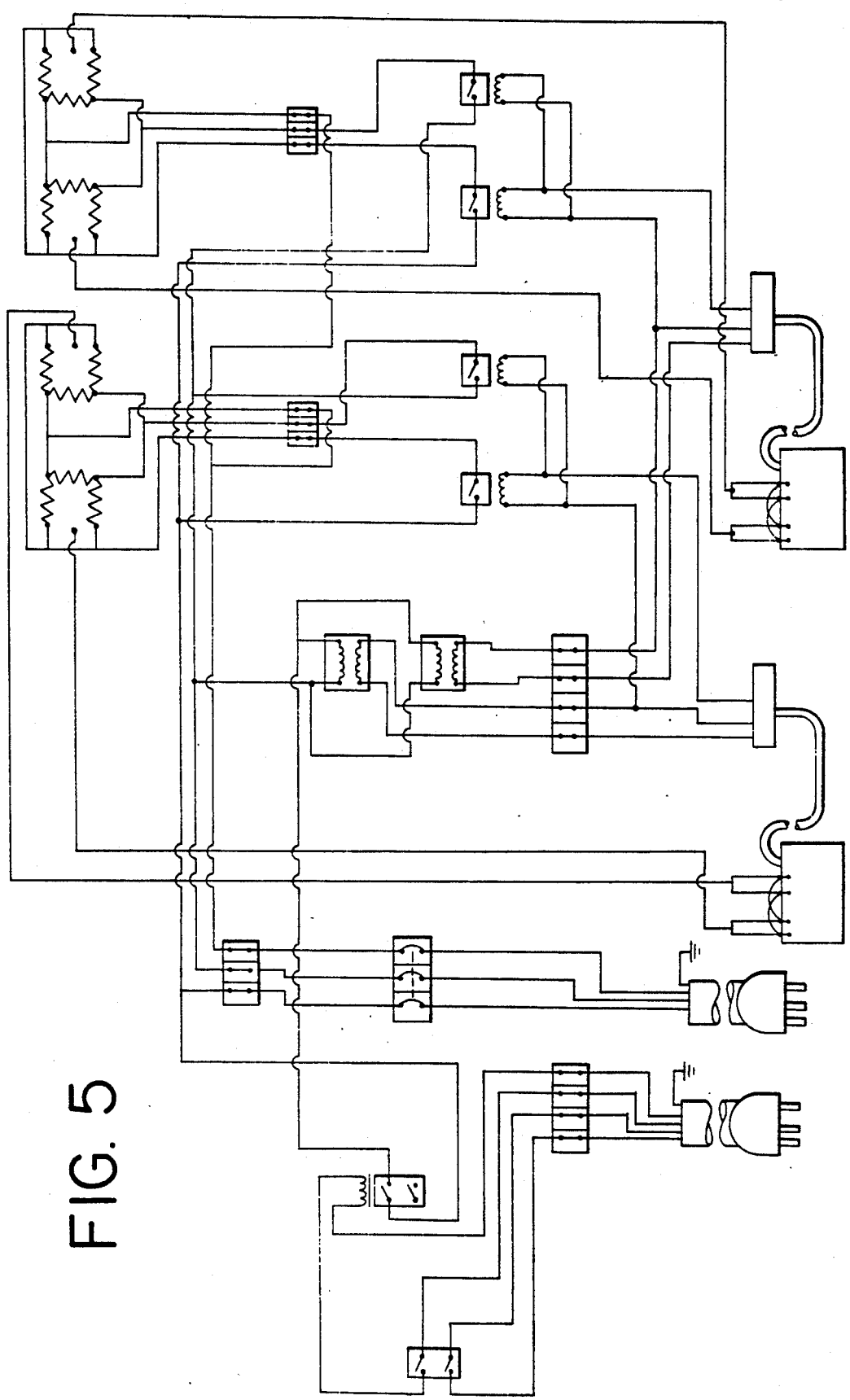
FIG. 5 is an electrical diagram showing components of the circuitry that provides control of the heating cycle of the apparatus. The electrical circuitry forms no part of the invention.

As may be seen in FIG. 4, the apparatus 10 also includes a heating cavity 40. The rack 14 is moved into this heating cavity 40 when the rack 14 is raised to its heat processing position. Preferably, the configuration of the apparatus 10 is such that only minimal air currents pass through the cavity 40. One such configuration is shown in the apparatus 10 of FIGS. 1-4. In this apparatus 10, the heating portion 42 (FIGS. 1 and 3) is closed on all sides, except for a slot 44 at the bottom of the heating portion 42, and some relatively small ventilation openings in an otherwise solid panel 46 at the top of the heating portion 42. In the configuration of FIGS. 1-4, the minimal air currents that occur are due to the heating of the cavity by a pair of heating means 48 and 50, each such heating means being on opposite sides of the cavity 40. Air in the cavity between these heating means 48 and 50 is heated to a temperature higher than the surrounding ambient air and, as a result, rises. The relatively colder ambient air enters the cavity 40 through its bottom slot 44 to fill the resulting vacuum, causing the slight eddy currents. The apparatus 10, however, includes no provision for artificially-induced air movement. These eddy currents are also advantageous in that they dry the surface of the food slightly and, in that way, lower the amount of juices dripped from that surface. This, in turn, lowers the potential for smoke produced by such juices.

Heating means 48 are provided on at least one side of the heating cavity 40. In this embodiment, however, a pair of heating means 48 and 50 are provided. Again, for simplicity, only one of the heating means 48 will be described, as the other heating means 50 is essentially identical.

Heating means 48 comprises a ceramic sheet 52 and a heating element 54. A suitable ceramic sheet 52 is sold under the name Neoceram, and is made by Nippon Glass. This ceramic sheet 52 preferably has a thickness of from two to five millimeters. As may be seen from FIG. 4, the ceramic sheet 52 is disposed between the heating cavity 40 and the heating element 54. The reason for this is that during heat-induced caramelization, the food held in racks 14 and 16 tends to spatter or drip. The ceramic sheet 52 is able to withstand the temperature extremes in which it must operate, and can be spattered upon without breaking. Much of the debris which spatters or drips onto the ceramic sheet 52 evaporates or is disintegrated on contact. The remainder can be readily cleaned from the ceramic sheet 52 with nonabrasive cleaning agents after the apparatus 10 has cooled.

The preferred heating element 54 of the apparatus 10 is an infrared heater. It will be understood by those skilled in the art, however, that other heaters, such as quartz heaters, may be used.

In the preferred embodiment, each ceramic sheet 52 and infrared heater 54 on each side of the cavity are combined into a single heating panel. This single heating panel is manufactured by Solar Products, Inc., 228 Wanaque Avenue, Pompton Lakes, N.J. 07442-2104. This single heating panel provides 4.5 kilowatts (kW) of power over the entire face of the ceramic sheet. The ceramic sheet 52 may be of any suitable dimension, but in this preferred embodiment has dimensions of approximately 16×14 inches.

The heating panel is comprised of a heater element that is wound like a spring. Each of these heater elements are provided by Solar Products from resistance wire manufactured by any of a number of suppliers. One example of a suitable resistance wire is that supplied by Hoskins Manufacturing Company, 10770 Hall Road, Hamburg, Mich. 43139. This Hoskins wire is its grade 875, and is primarily comprised of iron, chromium and aluminum. In particular, this Hoskins wire has an iron content of 71 percent, a chromium content of 22.5 percent and an aluminum content of 5.6 percent.

This coiled resistance wire is supported on a high-temperature refractory board manufactured by either Rex Roto Corporation (sold as AL3 board) or Refractory Products Corporation, 770 Tollgate Road, Elgin, Ill. 60123 (RPC 2300). An insulating board (Alfibond 2300, also supplied by Refractory Products) made of refractory ceramic fiber, colloidal alumina and colloidal silica aids in preventing the heat of the apparatus 10 from being transferred from the cavity 40 to its exterior, 304-stainless steel panel walls.

A high temperature cement, provided by Rex Roto (R300) or Carborundum (DF-180), holds the coiled resistance wire to the insulating board. The coiled resistance wire is spot welded to terminals made of 309-stainless steel. These terminals are welded to 304-stainless steel terminals which are accessible from the outside of the apparatus 10. Ceramic bushings made of steatite are available from Durco Ceramics Co., P.O. Box 568, Saxonburg, Pa. 16056.

It will be appreciated by the reader that the arrangement of the cavity 40 and heating means 48 are such that precise distances between the food and heating means 48 can be assured. This occurs because the racks 14 and 16 are always moved into the same position between the heating means 48, and the heating means 48 themselves are fixed and stationary.

In another embodiment of the invention, however, these heating means 48 and 50 are movable. Movable heating means 48 and 50 could be controlled by a screw-like knob having left- and right-hand thread configurations which urge the heating means 48 and 50 along parallel tracks towards and away from the center line of the racks 14 and 16. In the current embodiment, the stationary distance between heating means 48 and 50 is well over 1 inch to provide adequate space for bulky chicken parts. In the embodiment including movable heating means 48 and 50, this distance could be increased or decreased down to as little as ½ inch. The ability to decrease this distance down to as little as ½ inch would be desirable as, but one example, for the preparation of ground beef, pork, chicken and turkey patties.

Obviously, the time of exposure and the temperature of the heating means 48 and 50 are two variables that can be easily changed. With the addition of heating elements 48 and 50 that are movable towards and away from the center line of the rack, a third variable is added. These three variables combined enable the operator to custom-tailor the heating characteristics of the apparatus 10 to a particular type of food.

As may be seen in FIGS. 2, 3 and 4, the apparatus 10 includes two power cords. The first of these power cords 56 provides 110-volt power for the control panels 60 and their related control circuitry. This power cord 56 may also be used to provide an interlock with a building fan, such that the apparatus 10 cannot operate unless the fan is running.

The second of these power cords 58 provides 208-volt power for the heating elements. This 208-volt power cord 58 could also provide power for an optional motor (not shown) for automatically raising and lowering the racks 14 and 16 at appropriate intervals.

When the chicken is in the heating portion 42 of the apparatus, juices from the chicken may drip and fall onto the surface immediately below the slot 44. To minimize the mess created by these drippings, the apparatus includes a grate 60 which covers a semicircular drip pan 62. The drippings fall through the grate 60 and are collected in the drip pan 62. To facilitate easier cleaning of the apparatus and disposal of the drippings, the grate 60 is removable from the drip pan 62, and the drip pan 62 is removable from the flat surface 64 upon which pan 62 is supported.

Having described the preferred apparatus 10, the method of using this apparatus 10 may now be more easily described. The preferred method using this apparatus is a method for heat processing and cosmetically finishing food. The term "cosmetically finishing food" is intended to mean browning the surface of the food, whether that surface does or does not include a skin layer. This browning occurs as a result of a process commonly known as "caramelization." Caramelization occurs when sugar-containing components at or near the top layer of a food product are activated by heat to a darker, "browned" color. Upon continued application of heat, the caramelization process causes the color of the food to deepen, resulting in a blackened or even a charred appearance. The extent of caramelization can be easily varied by adjusting three factors: (1) duration or time of exposure of the food product to the radiation or heat source; (2) distance of the food from the radiation source; and (3) the temperature of the radiation.

As alluded to above, the food products that are to be caramelized using the above-described apparatus 10 are cooked in a near normal fashion, but at relatively lower temperatures. Through this normal cooking process, that food is rendered nontoxic, i.e., all harmful bacteria are killed through attainment of a minimum safe temperature throughout the food. This food is typically not cooked beyond the time necessary for the attainment of this minimum temperature. Thus, caramelization does not occur.

The fully cooked food is then either refrigerated or frozen until it is ready to be finished prior to consumption. Then, it is removed from the refrigerator or freezer, and warmed in a suitable oven until it has reached the proper temperature for consumption. Such ovens also do not reach temperatures adequate for caramelization. Alternatively, for cosmetic or food texture reasons, caramelization is not desired until immediately prior to consumption.

In order to cause caramelization, this precooked, bacteriologically nontoxic food is introduced into a cavity, like cavity 40 of the apparatus 10 shown in FIG. 4. This cavity 40 has at least one source of intense heat, such as heating means 48, at one end of its ends.

The surfaces of this food are heated within the cavity 40 with this source of intense heat 48 until the surface of the food is caramelized. Conventional cooking processes cause caramelization during the prolonged cooking process. Such cooking can take the form of frying, grilling, poaching, roasting or broiling, and occurs at typical 350°–400° Fahrenheit cooking temperatures. In sharp contrast, a typical piece of precooked, heated chicken can be caramelized by the present method and apparatus 10 in about seventy (70) seconds, at a temperature of from 600°–1700° Fahrenheit. When a skinless piece of chicken was treated with an appropriate sugar-containing coating and then heated for seventy (70) seconds, the chicken had an uneven, attractive brown color that was very reminiscent of a skinned piece of chicken. An alarm in the apparatus 10 signalled the end of this seventy-second cycle.

It will be understood, however, that the time necessary for caramelization will depend on the character and size of the food being processed, and the extent of caramelization desired. Typically, the time necessary for caramelization with a device like that described in this specification will vary from twenty (20) to one hundred and eighty (180) seconds.

This method of heat processing and cosmetically finishing food is most effective when the cavity 40 is kept substantially free of air currents.

When full power is applied to the heating means 48, as discussed above, the temperatures in the cavity 40 may reach 1700° Fahrenheit. In order to conserve energy, yet keep the cavity 40 at a sufficiently high temperature to ensure quick processing, the heating means 48 are supplied with only 50 percent of their full power when the racks 14 are in their lowered, food loading positions (FIG. 1). When the heating means 48 are supplied with 50 percent of their full power, and during steady-state operating conditions of the apparatus 10, the temperature of the air in the cavity is at approximately 450°–500° Fahrenheit.

In its broadest embodiment, the present invention encompasses a horizontal apparatus as well as the vertical apparatus of FIGS. 1–4. This horizontal apparatus may be used for the processing of larger, bulkier foods, such as pizza.

While the specific embodiments have been illustrated and described, numerous modifications come to mind without markedly departing from the spirit of the invention. The scope of protection is, thus, only intended to be limited by the scope of the accompanying Claims.

What I claim is:

1. An apparatus for heating processing of food, comprising:
   a. a frame;
   b. a rack on which said food is held;
   c. rack displacement means for reciprocally moving said rack between a food loading position and a heat processing position, wherein said rack displacement means comprises both a lever and a cable and pulley-actuated linkage;
   d. a heating cavity into which said rack is moved when said rack is in said heat processing position; and,
   e. heating means on at least one side of said heating cavity.

2. An apparatus for heat processing of food, comprising:
   a. a frame;
   b. a rack on which said food is held;
   c. a rack displacement means for reciprocally moving said rack between a food loading position and a heat processing position, wherein said rack displacement means comprises both a lever and a chain and sprocket-actuated linkage;
   d. a heating cavity into which said rack is moved when said rack is in said heat processing position; and,
   e. heating means on at least one side of said heating cavity.

3. An apparatus for heat processing of food, comprising:
   a. a frame;
   b. a rack on which said food is held;
   c. a rack displacement means for reciprocally moving said rack between a food loading position and a heat processing position, wherein said rack displacement means comprises both a lever and a cable and pulley-actuated linkage, and further wherein said cable and pulley-actuated linkage includes a metallic element, and further includes a magnetic holding means, said metallic element abutting against said magnetic holding means when said rack is in its heat processing position to retain said rack in its heat processing position;
   d. a heating cavity into which said rack is moved when said rack is in said heat processing position; and,
   e. heating means on at least one side of said heating cavity.

4. An apparatus for heating processing of food, comprising:
   a. a frame;
   b. a rack on which said food is held;
   c. rack displacement means for reciprocally moving said rack between a food loading position and a heat processing position, wherein said rack displacement means comprises both a lever and a cable and pulley-actuated linkage, and wherein said cable and pulley-actuated linkage includes a metallic element, and further includes a magnetic holding means, said metallic element abutting against said magnetic holding means when said rack is in its heat processing position to retain said rack in its heat processing position, said rack displacement means further comprising a shock-absorbing element, said shock-absorbing element limiting the travel of said metallic element when said rack is moved into its heat processing position;
   d. a heating cavity into which said rack is moved when said rack is in said heat processing position; and, e. a heating means on at least one side of said heating cavity.

5. An apparatus for heat processing of food, comprising:
   a. a frame;
   b. a rack on which said food is held;
   c. rack displacement means for reciprocally moving said rack between a food loading position and a heat processing position;
   d. a heating cavity into which said rack is moved when said rack is in said heat processing position; and,
   e. heating means on at least one side of said heating cavity wherein said heating means is comprised of a ceramic sheet and a heating element, said ceramic sheet being disposed between said heating cavity and said heating element.

6. An apparatus for heating processing of food, comprising:
   a. a frame;
   b. a rack on which said food is held;
   c. rack displacement means for reciprocally moving said rack between a food loading position and a heat processing position;
   d. a heating cavity into which said rack is moved when said rack is in said heat processing position; and,
   e. heating means on at least one side of said heating cavity wherein said heating means is comprised of a ceramic sheet and a heating element, said ceramic sheet being disposed between said heating cavity and said heating element, and further wherein said heating element is an infrared heater.

7. An apparatus for heat processing of food, comprising:
   a. a frame;
   b. a rack, said rack including a plurality of hook-like projections for holding said food;
   c. rack displacement means for reciprocally moving said rack between a food loading position and a heat processing position, said rack displacement means comprising both a lever and a cable and pulley-actuated linkage;
   d. a heating cavity into which said rack is moved when said rack is in said heat processing position; and
   e. heating means on at least one side of said heating cavity.

8. The apparatus of claim 7, wherein said cable and pulley-actuated linkage includes a metallic element, and further includes a magnetic holding means, said metallic element abutting against said magnetic holding means when said rack is in its heat processing position to retain said rack in its heat processing position.

9. The apparatus of claim 8, further comprising a shock-absorbing element, said shock-absorbing element limiting the travel of said metallic element when said rack is moved into its heat processing position.

10. The apparatus of claim 7, wherein said heating means is comprised of a ceramic sheet and a heating element, said ceramic sheet being disposed between said heating cavity and said heating element.

11. The apparatus of claim 10, wherein said heating element is an infrared heater.

* * * * *

UNITED STATES PATENT AND TRADEMARK OFFICE
CERTIFICATE OF CORRECTION

PATENT NO. : 5,315,920
DATED : May 31, 1994
INVENTOR(S) : Benno E. Liebermann

It is certified that error appears in the above-indentified patent and that said Letters Patent is hereby corrected as shown below:

In the Claims, Col. 7, line 67, delete "heating" and insert "heat" therefor.

Signed and Sealed this

Fifteenth Day of November, 1994

Attest:

BRUCE LEHMAN

*Attesting Officer*     *Commissioner of Patents and Trademarks*